United States Patent [19]

McGraw

[11] Patent Number: 4,672,006

[45] Date of Patent: Jun. 9, 1987

[54] TREE PROCESSING AND WOOD PRODUCTS SYSTEM

[76] Inventor: David W. McGraw, Box 220 R.F.D. #1, Penobscot, Me. 04614

[21] Appl. No.: 845,240

[22] Filed: Mar. 28, 1986

[51] Int. Cl.[4] ........................ B32B 23/08; B27C 9/00; B27M 1/00

[52] U.S. Cl. ...................................... 428/528; 100/37; 100/41; 100/131; 144/2 R; 144/3 R; 144/335; 144/362; 144/193 R; 144/208 R; 144/2 Z; 144/380; 264/45.3; 428/537.1

[58] Field of Search ..................... 428/528, 537.1, 375; 264/45.3, 128; 100/37, 95, 131, 341, 53, 176; 144/2 R, 362, 335, 193 R, 3 R, 367, 380, 366, 364, 2 Z, 361

[56] References Cited

U.S. PATENT DOCUMENTS

| | | | |
|---|---|---|---|
| 1,480,658 | 1/1924 | Bostock | 144/361 |
| 3,674,219 | 7/1972 | Harvey, Jr. | 144/367 |
| 3,963,064 | 6/1976 | Hayes | 144/2 Z |
| 4,098,311 | 7/1978 | Larsson | 144/2 Z |
| 4,232,067 | 11/1980 | Coleman | 144/361 |
| 4,364,423 | 12/1982 | Schilling | 144/362 |
| 4,371,020 | 2/1983 | Barnes et al. | 144/366 |
| 4,421,149 | 12/1983 | Barnes et al. | 144/366 |

*Primary Examiner*—W. D. Bray

*Attorney, Agent, or Firm*—Daniel H. Kane, Jr.

[57] ABSTRACT

A system is described for processing an entire tree into wood fiber material for molding the constituent wood elements into custom molded wood products. A delimber removes limbs and leaves from the trunk, a debarker removes bark from the trunk of the delimbed tree, and a splitter separating sequence is constructed and arranged for separating the debarked trunk into elongate pieces of substantially equal cross-sectional area. A graduated roller mill having a sequence of pairs of compressor rollers with the rollers of each pair spaced successively closer together receives the elongate pieces of wood and extrudes and delivers thin sheets of wood at the output end. Liquid squeezed from the wood sheets is collected and separated into resins and water. A shredder shreds and fragments the wood sheet wood fibers into a loosely bonded mat of substantially separate striated wood fibers. The mat is cut or chopped into wood fibers of substantially uniform length. The constituent elements of the tree are reconstituted in a slurry for custom molding. The resulting wood material product is a new material composite of a uniform length isotropically distributed lignocellulose fiber phase and resin and plastic phase of natural tree wood resins and additive plastic resins binding the lignocellulose fibers in a composite matrix.

31 Claims, 16 Drawing Figures

TREE PROCESSING AND WOOD PRODUCTS SYSTEM

TECHNICAL FIELD

This invention relates to a new system and method for processing an entire tree to a substantially uniform and friable natural lignocellulosic material. The material is reduced to the wood fiber or filament level. The system apparatus for tree processing is modular and transportable to a woodlot for producing the uniform lignocellulosic wood material. A slurry of the wood material is injection molded at factory or molding sites for production of boat hulls, fence posts, sanitary pipes, house shingles, siding panels, shipping crates, etc. There is maximum utilization of the constituent wood fiber, lignin and resin elements of the tree.

BACKGROUND ART

A variety of methods and hardware equipment have been devised for compressing, crushing, and extracting liquid from logs, lumber and other lignocellulosic materials. The Gyles U.S. Pat. No. 128,387 of 1872 illustrates the broad . concept of "removing the moisture which saturates the woody fiber of lumber" by drawing and feeding sawn pieces of lumber or planks between compressing rolls. The Buchanan U.S. Pat. No. 4,285,373 describes an apparatus for crushing logs between endless loops or belts. The belts are tapered or spaced in a configuration leading to a tapering throat. As the log passes into the narrowing throat, it is progressively split and broken laterally. The log is fractured and reduced to longitudinally extending slivers and strips.

A number of other hardware equipment arrangements press or crush logs. The Stadler U.S. Pat. No. 2,510,674 describes the use of a cone and cylinder for creating an annular compression zone. The Jones U.S. Pat. No. 4,085,783 describes the use of a platform and hydraulic press for subjecting a horizontal stack of logs to mechanical compression for squeezing sap and resin out of the ends of the logs and for loosening bark.

No prior art of which applicant is aware contemplates whole tree processing nor do any of the references describe appropriate hardware equipment for successively processing an entire tree to a substantially uniform wood material reduced to the fiber or filament constituents. The use of graduated rollers in a graduated rolling mill is described in U.S. Pat. No. 11,769 for producing cotton and in U.S. Pat. No. 3,660,207 for producing laminates. No prior art references or disclosures, however, describe the use of a graduated rolling mill and related hardware for processing an entire tree, successively reducing or "wringing" elongate trunk pieces, and effectively "extruding" elongate wood pieces as thin wood sheets for further processing. No patents of which applicant is aware describe systems, methods and hardware for further processing the entire tree into a substantially uniform length wood fiber material useful in preparing a wood material slurry for injection molding.

Methods and equipment have also been devised for reconstituting and molding wood fibers and lignocellulosic materials to produce molded products. Typically, however, as in the Geimer U.S. Pat. No. 4,393,019, an additional artificial thermosetting resin binder is added to the slurry or mixture before molding the reconstituted wood product. The Marra U.S. Pat. No. 3,671,377 describes a method for producing composite products with isotropic structural characteristics in which the wood fiber filler material grains are oriented in all directions to give a "three dimensional skeletal structure". Artificial polymer resin binders are added to the slurry.

No prior art of which applicant is aware discloses the custom molding of wood products from a wood material slurry composed essentially entirely of the constituents of a whole tree with the lignocellulose fibers and filaments processed to a substantially uniform friable wood material and mixed with the liquid resin constituents derived from the tree to form a moldable slurry with additives where desired.

OBJECTS OF THE INVENTION

It is therefore an object of the present invention to provide a new system and method for processing an entire tree into a substantially uniform friable lignocellulosic wood material and separated liquid constituents which may be mixed to form a custom moldable wood material slurry.

Another object of the invention is to provide a new system and method for processing an entire tree by compressing and "wringing" elongate trunk pieces in a graduated roller mill extruding the elongate trunk pieces as thin sheets of wood. The solid and liquid constituents are thereby separated for further processing of the solid wood sheets into uniform length friable wood fiber fragments.

A further object of the invention is to achieve maximum utilization of all of the cellulose fiber, lignin, and resin constituents of a whole tree for production of custom molded wood products, providing fuel energy for the process, and reconstituting the processed constituents into the custom configuration molded wood products.

DISCLOSURE OF THE INVENTION

In order to accomplish these results the present invention provides a system for converting a tree into lignocellulosic wood fiber material for custom molded wood products including a delimber for removing limbs and leaves from the trunk of a tree, a debarker for removing bark from the trunk of the delimbed tree, and a splitter or separator sequence constructed and arranged for splitting or separating the debarked trunk into elongate pieces of substantially equal cross-sectional area. According to the invention, a graduated roller mill is provided including a sequence of pairs of compressing rollers having an input end for receiving the elongate pieces of wood split from the trunk and an output end for extruding and delivering thin sheets of wood. The rollers of each pair of the graduated roller mill are spaced successively closer together for compressing the elongate pieces of wood to successively thinner wood sheets, squeezing out water and resins. The lignins generally remain in the extruded wood sheets with the fibers embedded in the material lignins.

A collector configuration collects the water and resins squeezed from the sheets of wood while a separator tank separates the resins from the water for subsequent use of the resins. A shredder fragments and shreds the wood fibers of the wood sheets into a mat of substantially separated wood fibers. Finally, a chopper chops or cuts the substantially separate wood fibers into uniform selected wood fiber lengths. A drying step may also be incorporated with the shredding step or introduced separately in the process.

The invention also provides a further phase of processing of the tree constituents for molding and fabricating custom molded wood products of any desired configuration. A mixer mixes the wood fiber material of substantially uniform fiber lengths with tree resins and optionally with selective additives to form a lignocellulose wood fiber/resin/additive slurry. The homogeneous slurry of desired composition for the end product is injected into a mold, hardened and cured.

A feature and advantage of the uniform lignocellulosic wood material reduced to the fiber or filament level and the slurry mixture according to the invention is that the molded wood products comprise isotropic cellulose filaments embedded in the natural tree lignins. The lignocellulosic fibers are further bonded together by the natural tree resins. If adhesive bonding additives such as phenolic resin glues or lignin glues are added, the resin coating of the fibers facilitates bonding of the glue to the wood fibers in a novel and impenetrable composite matrix of natural cellulose fibers, lignins, resins, and additive binders.

In one example embodiment the splitter is formed by an annular blade support having a truncated conical configuration tapering from a smaller diameter entrance end for receiving the debarked trunk to a wider diameter exit end. A diameter wedge blade extends across the diameter of the annular blade support with the blade edge facing the entrance end. First and second spaced apart wedge blades orthogonal to the diameter wedge blade divide the splitter area inside the annular blade support into a plurality of substantially equal cross-sectional areas.

In another example embodiment, the shredder is provided by a microwave generator or a pair of microwave generators operatively arranged for pulsing wood sheets received from the output end of the compressor roll sequence with microwave energy. The microwave generator or generators are adjusted and arranged to deliver energy pulses with energy output for converting water in the wood sheet to steam, explosively expanding, separating and shredding the wood sheet fibers into a loosely bonded mat of substantially separate wood fibers. The microwave source therefore functions as both a shredder and a drier.

The chopper assembly of the preferred embodiment incorporates a cutting roller comprising a plurality of spaced radially extending blades. A backing roller with a flexible surface is positioned and arranged for abutting the cutting edge of the radially directed blades of the cutting roller. A mat feeder feeds the loosely bonded mat of substantially separate wood fibers between the cutting roller and backing roller for chopping and delivering wood fibers of substantially uniform length.

According to the invention, waste wood from the delimber and debarker are fed through a hopper and directed into a waste wood processing roll sequence of successive pairs of rollers, each pair being spaced successively closer together for compressing the waste wood particles. Guide plates guide the particles between successive pairs of rollers which squeeze out water and resins. Lignins may also be recovered from the waste wood through delignification steps. The lignins are then added to the wood material slurry for molding wood products.

The invention contemplates a number of additional features including recycling of water separated from liquid squeezed from the elongate trunk pieces and waste wood by heating and spraying the water on the compressing rollers of both the graduated rolling mill compressing roll sequence and the waste wood processing roll sequence to prevent adherence of resins and wood particles on the roller surfaces. The separated resins as constituent elements of the processed tree are also recycled by mixing in the molding slurry or saved for and related uses.

Sufficient water and moisture is removed from the waste wood particles by processing through the waste wood processing roll sequence so that the wood waste may be used as a fuel to fire a boiler. The resulting steam is used for system power generation and for process steam circulated through the molds for hardening and curing the slurry mixture.

In an alternative embodiment of the wood processing system, the delimbed and debarked tree trunk is first passed through a series of trunk compressing rollers prior to splitting or cutting the trunk into separate elongate pieces. This initial compressing roller sequence is intended to crush and compress the trunk to the maximum width permitted by the initial compressing role sequence. The pairs of rollers of the initial compressing role sequence are spaced apart a sufficient distance to accommodate the entire trunk and crush and compress the trunk to a slab having a width up to the width of the rolls.

Because the initial slab of wood is partially fragmented and parted at the fibers by the crushing and compressing action, it is easily cut or split into separate elongate pieces for processing and the graduated roller mill. The slab is therefore passed through a horizontal row of spaced apart vertical circular rotating knife-edge blades. The rotating circular knife-edge blades cut the partially fragmented slab into the separate elongate pieces for separate processing through the graduated roller mill as described above. The initial trunk compressing roll and rotating circular knives therefore provide an initial separating sequence for separating elongate pieces from the trunk.

In a further alternative a rotating roll with shredder points or blades over the surface of the roll is used for the shredder. The rotating shredding roller is applied to the wood sheets extruded from the graduated rolling mill. Each shredded wood sheet is then passed through the chopper to provide the wood fiber material of substantially uniform length fibers. Further drying of the wood material may be accomplished using an air dryer applied to the shredded wood material before or after it is chopped to produce standard sized wood fibers. For some applications the moisture removal accomplished by "wringing" and compressing in the graduated roller is sufficient and the further drying step is eliminated to retain a desired level of moisture in the wood material fibers.

A feature and advantage of the present invention is that essentially all of the constituent elements of the processed tree are incorporated in end products or recycled for maximum utilization of the tree wood constituents. Furthermore, wood products of any configuration may be custom molded according to the invention having substantially the characteristics of wood but with the wood elements reconstituted at the wood fiber level in the desired configuration. Furthermore, the wood fibers of substantially uniform length are distributed isotropically and randomly oriented through the slurry and subsequently cured wood product for uniform strength in all directions and dimensions.

According to another feature and advantage the custom molded wood product may retain the characteristics imparted by the lignins and resins of the original tree wood from which it is derived. The wood product may be modified as desired to impart particular characteristics of selected additives.

Generally the invention contemplates and provides a system for tree processing and production of final wood products by processing, fragmenting and dissecting the original tree down to its constituent elements at the wood fiber level. The constituent elements are reconstituted in a custom molded desired configuration with isotropic orientation of wood fibers embedded in the natural lignins and resins while retaining to the extent desired the characteristics imparted by the original constituents of the selected tree wood. Additives may be incorporated in the molding slurry to impart other characteristics in a novel composite matrix of cellulose fibers, lignins, resins, and additives such as adhesive binders.

Other objects, features and advantages of the invention are apparent in the following specification and accompanying drawings.

BRIEF DESCRIPTION OF THE DRAWINGS

FIG. 12 is a diagrammatic view of a drier for drying shredded and chopped wood fibers while FIG. 12A is a detailed fragmentary end view of the drier drum.

DESCRIPTION OF PREFERRED EXAMPLE EMBODIMENTS AND BEST MODE OF THE INVENTION

Figure 1:
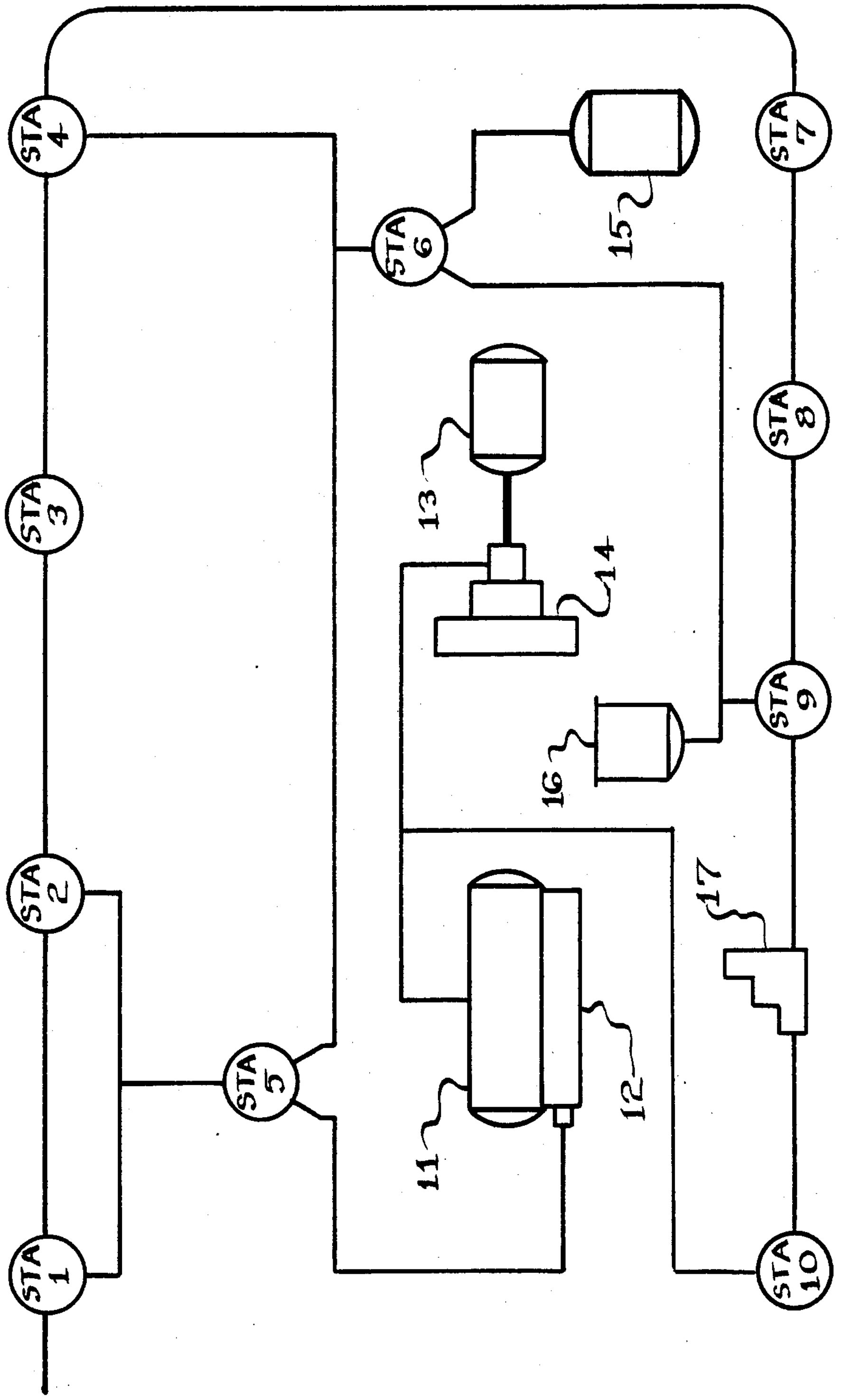
FIG. 1 is a block diagram and flow chart of the whole tree processing and wood products fabrication system.

A summary of the tree processing, wood materials and wood products system is presented with reference to the system flow chart and diagram of FIG. 1. Each of the Stations is identified briefly and a detailed description of each Station then follows the summary. An entire tree is first fed into a delimber at Station 1 where the limbs, including leaves, are removed. The limbs and leaves are then directed to the wood waste processing roll sequence of graduated roller pairs at Station 5. The trunk of the tree is fed into a debarker at Station 2 which removes all the bark from the trunk. The bark and other wood particles are also fed into the wood waste processing rolls at Station 5.

The debarked trunk is directed through a splitter or separator sequence at Station 3 which divides the trunk typically selected to be approximately 8 inches (20 cm) in diameter into six elongate pieces all having an equal cross-sectional area of, for example, approximately 8.4 square inches (54 $cm^2$) for the 8-inch (20 cm) diameter tree. The six individual pieces are automatically fed one by one into the compressor roll sequence of graduated roller pairs at Station 4. This graduated rolling mill compresses and reduces each elongate trunk piece into a wood sheet, for example, 1/16 inch (0.16 cm) thick and approximately 6 feet, 8½ inches (2 meters) wide.

In this process, the elongate pieces of wood are compressed to a cross-sectional area approximately 60% or less of the initial or starting cross-sectional area of the elongate wood pieces. The water and resins squeezed out of the elongate wood pieces by this "wringing" or squeezing action of the graduated rolling mill at Station 4 are collected and fed by a pipe or conduit to a resin/water separator at Station 6 for further use in the process. Separated water is stored in the hot water tank 15 for spraying on the rollers while resins may be mixed in the constituent wood material slurry at Station 9, all as hereafter described. Generally the lignins remain embedded in the extruded wood sheet.

The wood wastes roll sequence of graduated roller pairs at Station 5 accepts the wastes from both the delimber and debarker at Stations 1 and 2. The wood waste processing rollers remove sufficient water from the wood wastes so that they can be used as fuel. The mechanically dehydrated or rolled wastes are then fed automatically to the firebox 12 of a boiler 11 to produce steam. The steam from boiler 11 drives a steam turbine 14 and electrical generator 13 for system power. Boiler 11 also provides process steam for heat curing in the molds of the injection molding operation at Station 10.

The resin/water separator at Station 6 is a static flotation system and performs separation through an inclined baffle which allows the lighter resins to move towards the surface on one side of the separator tank. The heavier water is segregated by moving toward the bottom through the inclined baffle to the other side of the tank.

The wood sheets extruded by the compressing graduated roller mill from elongate trunk pieces still retain a fractional component of water. From the graduated roller mill the wood sheets are delivered to the shredder at Station 7. According to one example embodiment, the shredder uses a pulsed microwave energy source to remove the water from the wood sheets and therefore functions as a drier also. The rapid or explosive conversion of constituent water to vapor fragments and separates the individual wood fibers of the sheet forming a loosely bonded mat of substantially separate fibers. Alternatively, a mechanical shredder is used to form the shredded wood fiber mat. The wood fibers of the fiber material mat produced in the shredder of Station 7 are in random lengths.

To produce standard sized wood fibers appropriate for a particular wood material end product to be molded, the fibers are passed through the chopper or cutter at Station 8. The chopper mechanically cuts the fibers into substantially uniform lengths required for the particular molded end product. The wood fibers chopped from the mat are collected for delivery to the wood product fabrication or molding site. The shredded and chopped wood fibers may first be passed through a drier for removal of residual moisture according to the particular application. If the wood product injection molding factory is at a separate or remote location, the friable uniform fiber length lignocellulosic wood material product of cellulose fibers or filaments embedded in natural lignins is bagged for shipment to the fabrication or molding site.

Bagged wood fiber wood material product received at the factory or molding site is fed into a mixer at Station 9 where it is thoroughly mixed with resins such as the natural constituent resins of the tree separated at Station 6 and other desirable additives such as adhesive binders or catalysts from the additive reservoir or supply 16. The additives are selected to provide the necessary desirable qualities in the molded product. Where the processed tree species yields resins appropriate to the product to be molded, these resins are used to reduce the cost of the end product and to promote maximum utilization of all of the constituent materials of the tree. Other resins derived from the tree processing that are not appropriate for use in the molded products after separation may be marketed for other uses. Lignins extracted from the wood waste limbs, leaves and bark, may also be added to the slurry mixture including both soluble and insoluble lignins. Adhesive binder additives may include phenolic resin glues and lignin glues.

The slurry produced in the mixer of Station 9 by mixing the wood fiber material product of the present invention, resins and additives is then pumped by injection pump 17 into the permanent steel injection mold at Station 10. The mold is machined to give the selected proper form to the wood products, such as for example boat hulls, being molded. The resulting wood product is composite of isotropically distributed wood fibers or filaments embedded in a matrix of natural lignins, resins, and additive adhesive binders.

The tree delimber and tree debarker at Stations 1 and 2 make use of standard "off-the-shelf" equipment available in the wood processing industry, and therefore the delimber and debarker are not described in detail. For example, a rotor blade type debarking machine is described in the 1975 Canadian Pat. No. 969,073.

The splitter module at Station 3 splits and separates the delimbed, debarked tree trunk into elongate pieces sufficiently reduced in cross-sectional area so that they can be rolled out into sheets for example 1/16 inch (0.16 cm) thick that are no wider than can be processed by the wood compressing roller or roll pairs at Station 4. For the 8-inch (20 cm) diameter design basis tree, the splitter divides the tree into six substantially equal cross-sectional area segments of approximately 8.4 square inches (54 $cm^2$) each. Smaller trees and the narrower tops or top ends of the design basis tree will be split into six or less segments depending on the trunk size at the splitting end of the trunk entering Station 3.

Figure 2A:
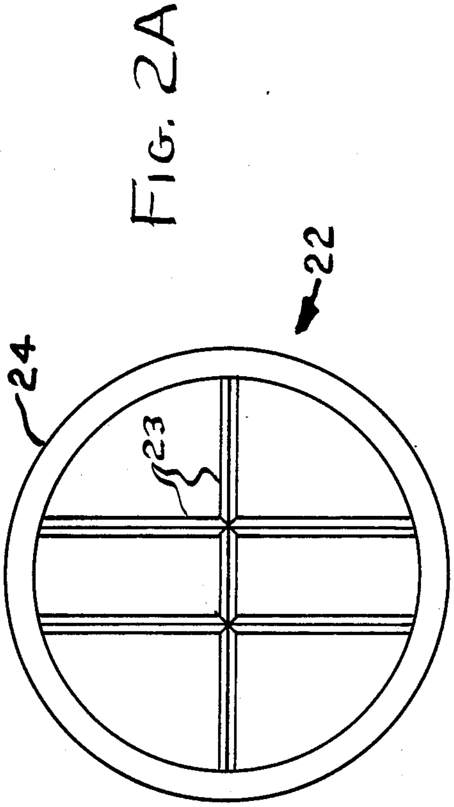
FIG. 2A is a detailed plan view of the cutting or splitting blade for splitting the delimbed and debarked trunk into separate elongate pieces.
Figure 2:
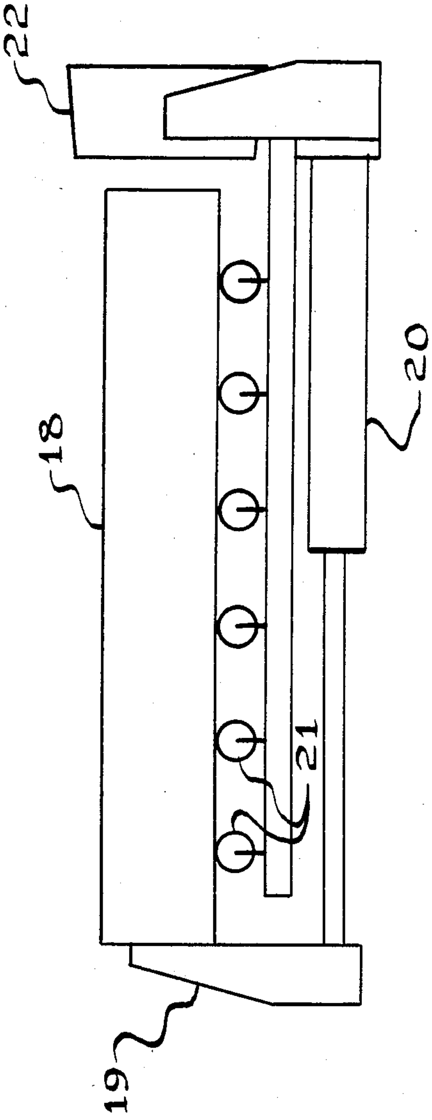
FIG. 2 is a diagrammatic view of the tree trunk splitter equipment at Station 3 of the system.

As shown in FIG. 2, the delimbed and debarked tree trunk length or section 18 is supported on a number of supporting and conveying rollers 21 and is pushed through the splitter 22 by an hydraulic feed cylinder 20 to which is attached the feed arm 19. The splitter assembly 22 consists of a number of splitter knife segments or blades 23 supported at the outer ends by the knife support ring or annular blade support 24 as shown in FIG. 2A. The knife segments or blades are tapered or wedge shaped, being sharp at the splitting edge or input end and tapering with increased width toward the exit end to afford the necessary structural strength. The annular blade support 24 is conical in shape, a truncated cone section, with the diameter at the inlet side smaller than the diameter at the outlet side. The truncated conical shape provides clearance for the elongate pieces that split from the trunk to prevent binding or wedging between the blades and to provide space for the individual elongate segments or pieces to spread outwards during movement through the splitter.

Figure 3:
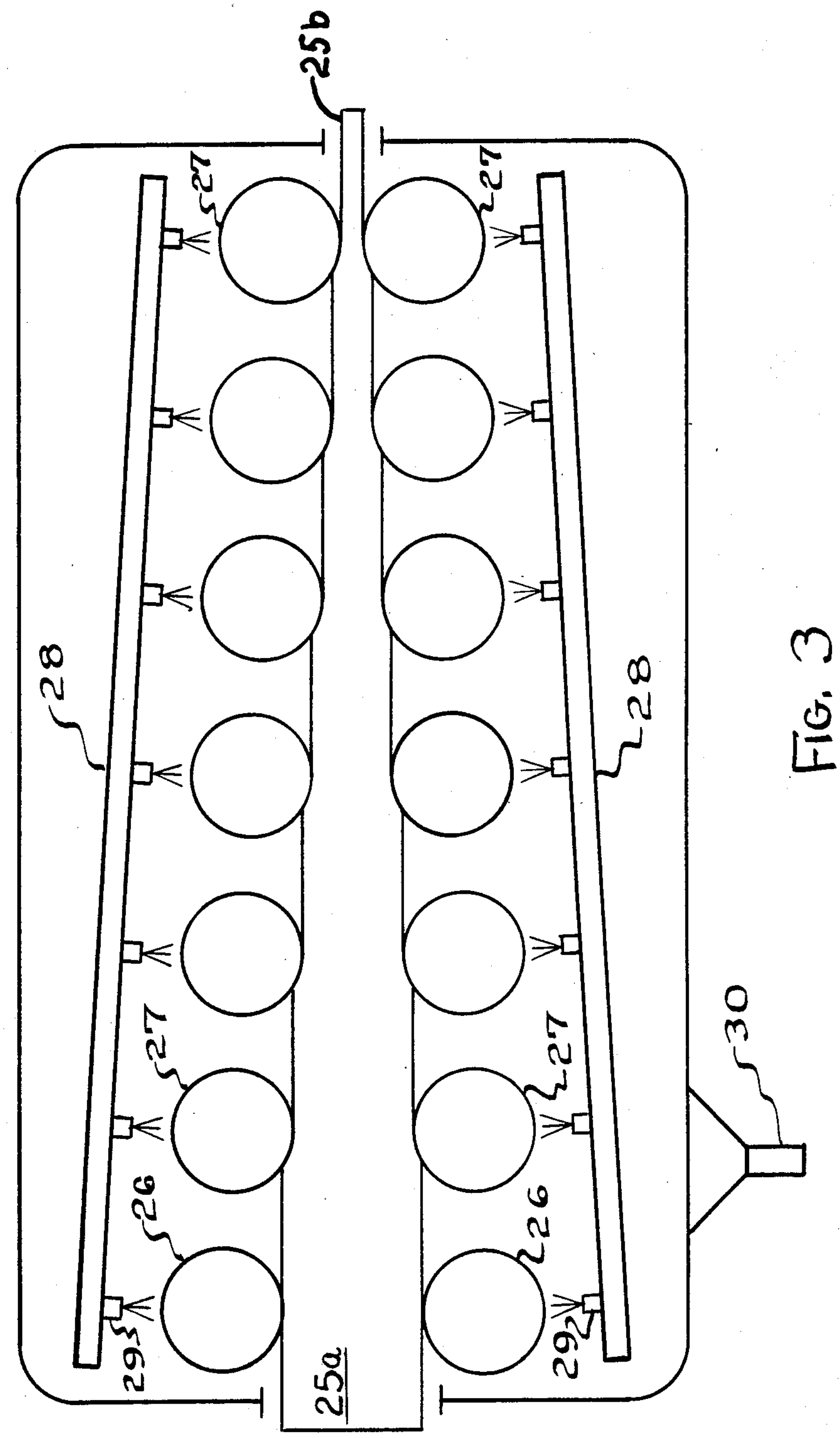
FIG. 3 is a diagrammatic view of the graduated roller mill for compressing, squeezing or wringing and extruding elongate trunk pieces into thin sheets of wood at Station 4.

The wood product compressing roll sequence illustrated in FIG. 3 reduces the thickness of each elongate trunk piece or segment for example to the order of 1/16 inch (0.16 cm) or to whatever spacing is set between the rollers of the final pair of rollers in the sequence. The compressing roll sequence or graduated roller mill is formed by successive pairs of rollers 27 with the rollers of each pair being spaced successively closer together from the input to the output. In the process of compression and reduction, both water and resins are removed from the wood. These products are collected and saved for future use in the process itself or for sale as a process by-product.

The elongate wood strip 25*a* split from the tree trunk is forced into the reducing or compressing roll sequence by the first feed roll set 26. The feed roll or drive roll 26 is formed with parallel ridges, lands, or grooves to "grab" the elongate piece of wood. As the strip travels through successive wood thickness reduction roll sets or compressing roll pairs 27 the strip is gradually reduced to the final desired thickness and is extruded as wood sheet 25*b*. In this process, the strip width increases as it passes through each of the reduction roll sets or pairs. The maximum width for the largest starting elongate strip or piece is approximately 80½ inches (2 m). All the rollers 26 and 27 of the graduated roller mill are power driven by a motor drive source not shown for uniform movement through the sequence of rollers.

To keep the rollers clean and to prevent adherence and buildup of the resin or wood particles, each roll is continually sprayed with hot water. The water is supplied through the cleaning spray manifolds 28, located both above and below the pairs of rollers 27. The hot water is directed against the rolls with high velocity from the individual spray nozzles 29. The water and resins removed from the elongate wood pieces during graduated compression and the water from the spray nozzles 29 are collected and flow to the water/resin drain outlet 30. The water and resin liquid mixture draining from the wood product compressing roll sequence or graduated roller mill is directed to the resin/-water separator at Station 6. Lignins which bind the fibers together generally remain in the wood sheet extruded by the graduated roller mill compressing roll sequence.

The waste wood processing roll sequence presses or squeezes wood particles from the delimber and debarker and removes sufficient moisture so that the wastes can be used as fuel to fire a boiler. The boiler 11 shown in FIG. 1 provides process steam for the system and in particular the molds at Station 10. The steam also drives the steam turbine 14 and electric generator 13 that supply power to the system.

Figure 4:
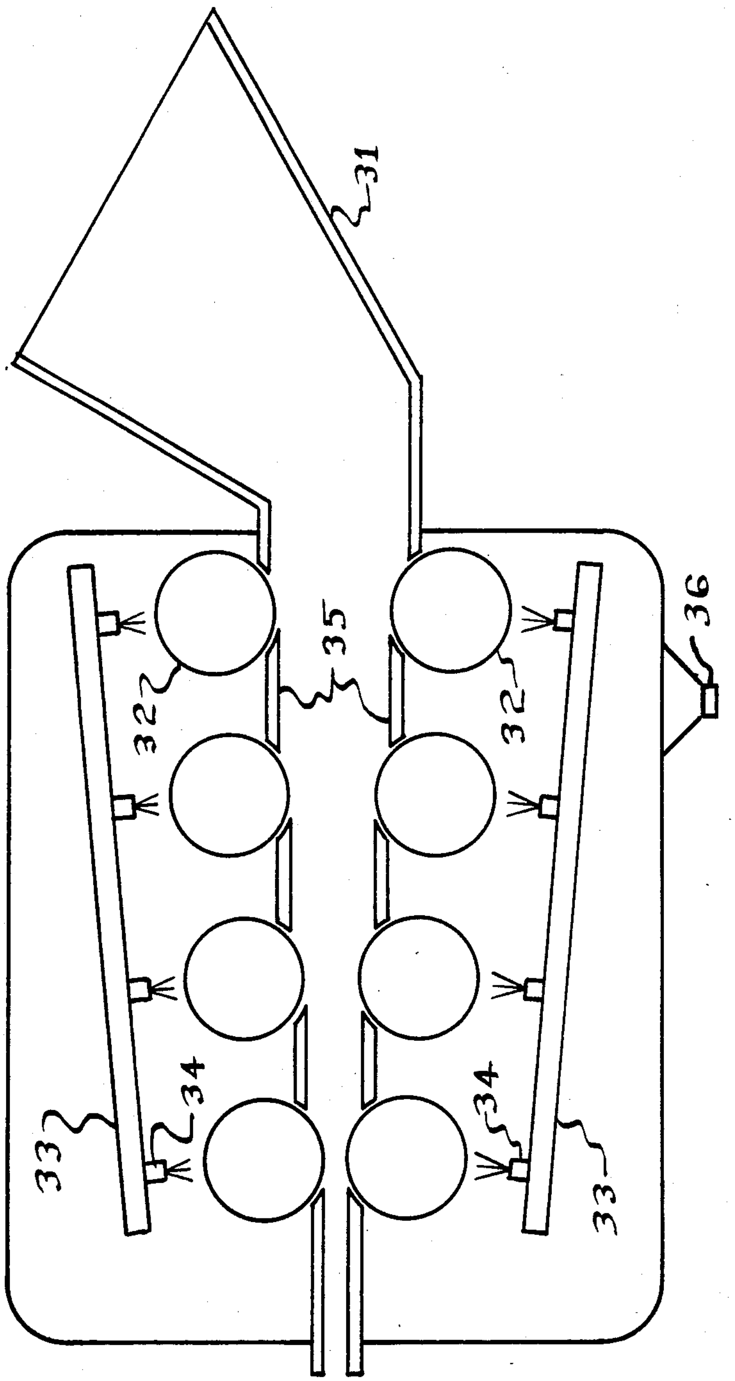
FIG. 4 is a diagrammatic view of the roll sequence for compressing and processing waste wood from the delimbed and debarked tree through successive graduated rollers at Station 5.

The waste wood particles from the delimber and debarker Stations 1 and 2 are directed to the hopper 31 at Station 5 where they are fed in between the roll sets or roller pairs 32, all as shown in FIG. 4. The sequence of roller pairs 32 is arranged with rolls or rollers of each pair spaced successively closer together gradually compressing the wood particles to remove moisture. Each of the rollers is power driven by a motor drive, not shown, for uniform movement through the sequence of rolls. The wood particles, which are not retained in a solid mass, are guided along by the guide plates 35 between the pairs of rollers 32. Both the upper and lower rollers of each set or pair are continuously cleaned with hot process water. Hot water from hot water tank 15 of FIG. 1 is supplied by the cleaning spray manifolds 33 and is directed onto the rolls by the cleaning spray nozzles 34 on either side of the pairs of rollers 32. The water/resin mixture removed from the wood waste and the water used to clean the roll are collected in the bottom of the roll sequence enclosure and are removed from the module through the drain outlet 36. This water and resin mixture may be recycled through the separator at Station 6.

Lignins may be removed from the waste wood particles by any of the number of well known delignification processes, not shown, such as, for example, used in wood pulping. The extracted lignins, for example in powder form, may be added to the final wood product slurry mixture at Station 9.

Figure 5:
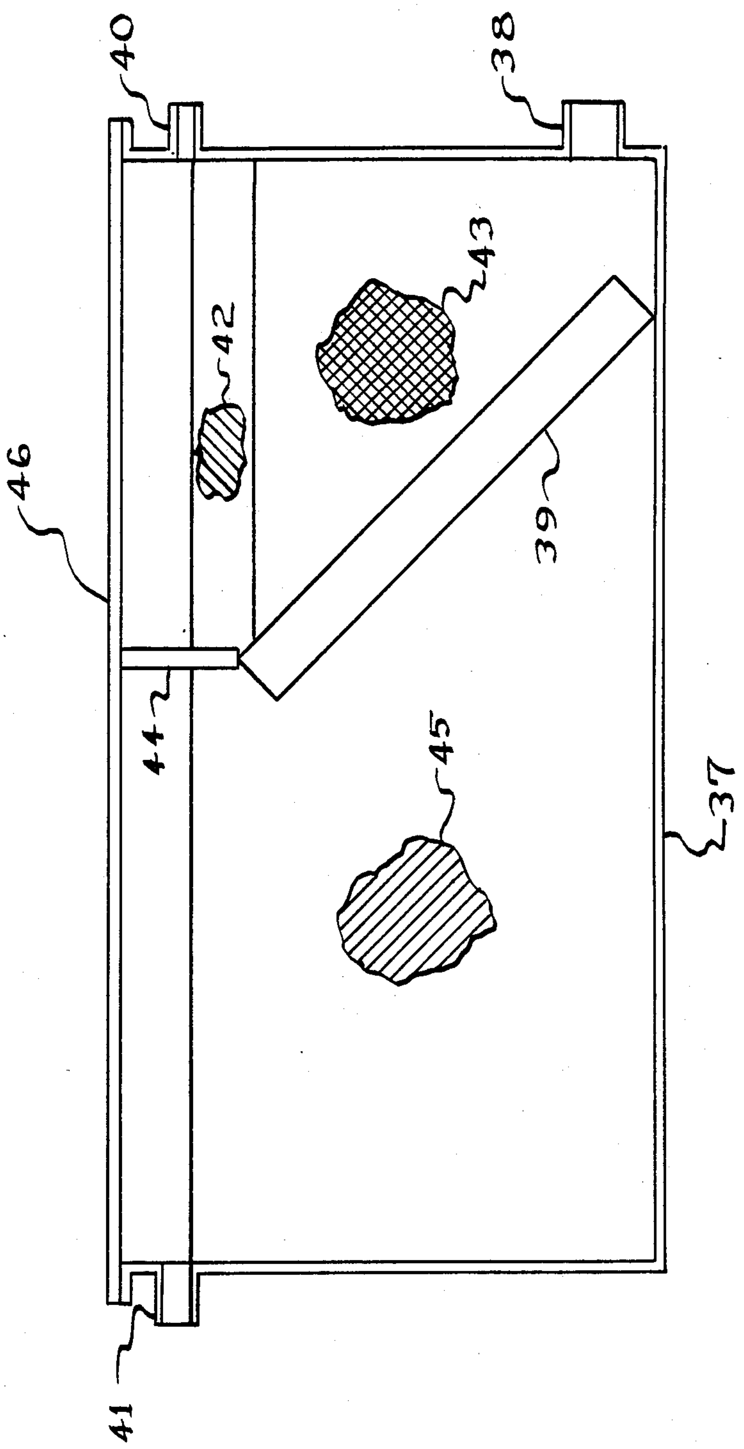
FIG. 5 is a diagrammatic view of the separator at Station 6 for separating water and resins from liquids squeezed and collected from the elongate trunk pieces and wood waste.

The separator which separates water from the resin in the resin/water mixtures that drain from both the wood sheet graduated roller mill of compressing rollers and the waste wood processing roll sequence is shown in FIG. 5. The resin/water separator utilizes a large volume tank 37. The volume is selected to be large enough that the quantity of liquids draining into the tank is small compared to the tank volume. As a result, the flow velocities of the liquids while in the tank are very low. The resin/water mixture 43 enters the tank through the resin/water nozzle 38. When the liquid level on the inlet side or right side of the inclined separator baffle 39 is greater than on the outlet side of the baffle 39, the resin/water mixture tends to separate by segregated flow through the baffle. The inclined corrugated baffle 39 consists of downwardly directed passageways or channels which are higher on the inlet side on the right and lower on the outlet side on the left. The resin 40, being lighter than water, tends to rise upward from the inclined baffle plate or module 39 on the right side while the heavier water 45 continues on through to the left side. When the volume level of the liquids in the tank is high enough, the water flows through water outlet nozzle 41 while the resin flows out through the resin outlet nozzle 40. To maintain separation between the resin and water in case the liquids in the tank should rise to an abnormal level, a divider 42 is installed above the separating baffle 39 as shown in FIG. 5. A cover 46 is provided to prevent the entry of extraneous materials into the liquids.

Figure 6:
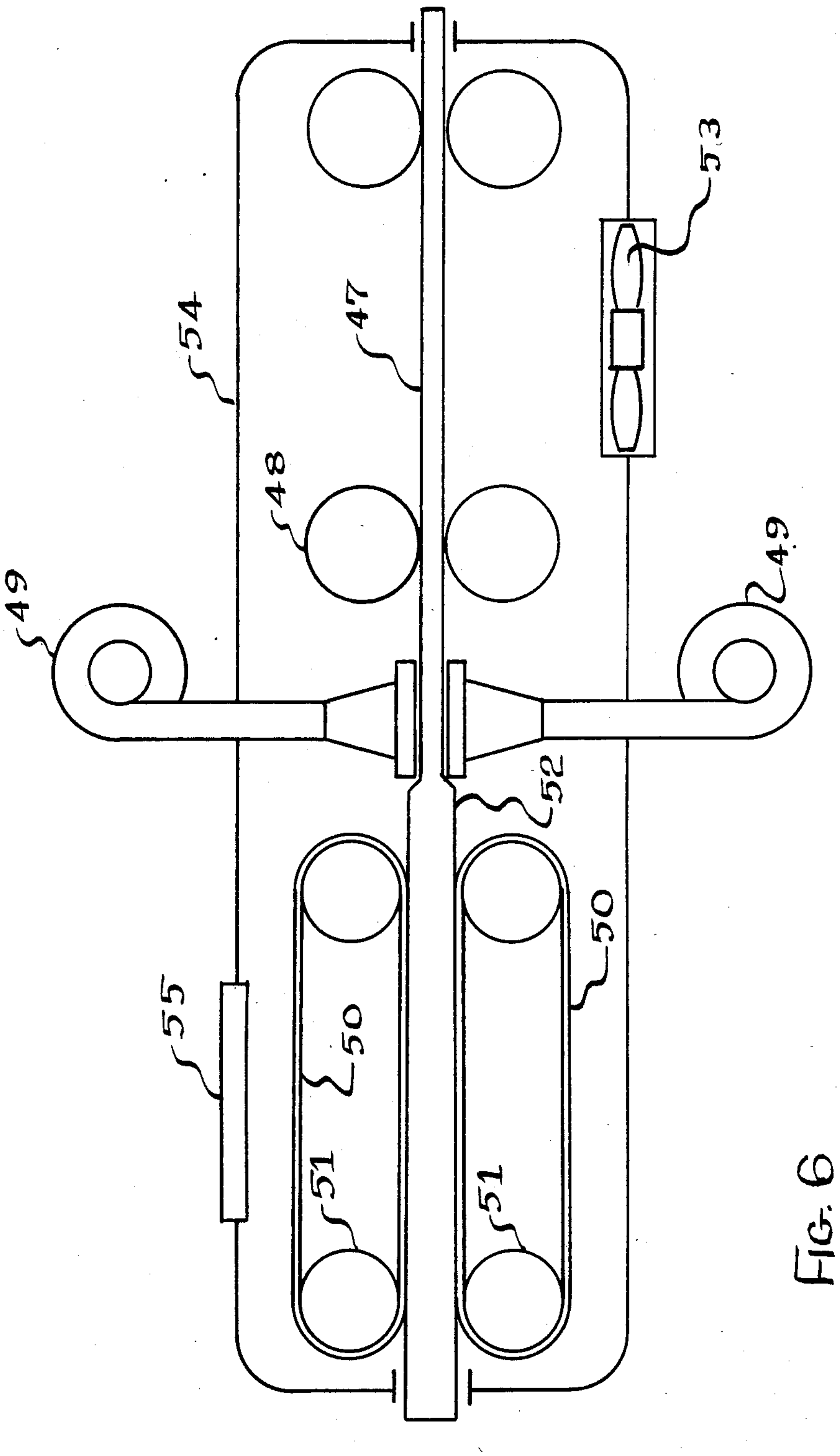
FIG. 6 is a diagrammatic view of the drier and shredder at Station 7 which converts the extruded thin wood sheet into a loosely bonded but integral mat of substantially separate wood fibers using pulsed microwave beams.

The shredder assembly or module of Station 7 is shown in detail in FIG. 6 and converts the thin wood sheets into a loosely bonded but integral mat of substantially separate wood fibers using pulsed microwave generators. The high energy content of the microwave beam pulses rapidly converts the remaining liquid in the wood to steam which expands explosively to separate the individual fibers in the sheet. In the process of changing the liquid into steam, the remaining moisture is removed from the wood. The moisture, which is in vapor form, is recovered for subsequent use in the process.

The thin wood sheet 47 extruded from the graduated compressing roller mill is translated between the juxtaposed or opposing microwave generators 49 by feed rolls 48. The microwave energy explosively fractures the wood sheet, transforming it into a mat 52 of loosely bonded, essentially individual, wood fibers. To control, support, and convey the mat it is held and fed between fibrated wood belts 50, which are moved by the belt drive rollers 51. The microwave energy is controlled by the shielding containment 54 to prevent any harm to personnel or materials in the vicinity.

The moisture in the wood vaporizes when the wood fibers are separated by the microwave pulses and the water vapor is removed from the drier/shredder by a fan 53. The fan blows cool dry air into the containment enclosure forcing the moisture-laden air out through an air cooled condenser 55. The moisture is stripped from the exhaust air in the air cooled condenser 55 and is fed into the system hot water reservoir to be reused in the process.

The loosely bonded wood fiber mat 52 produced by the drier/shredder assembly of FIG. 6 consists of a mass of substantially separate wood fibers of random lengths. To convert the fiber mat into a friable wood material of controlled wood fiber lengths, it is fed through the chopper assembly illustrated in FIG. 7. The selected and substantially uniform wood fiber lengths produced by the cutter or chopper of FIG. 7 can be varied to provide the wood fiber lengths suitable for the end products being molded from the friable wood material.

Figure 7:
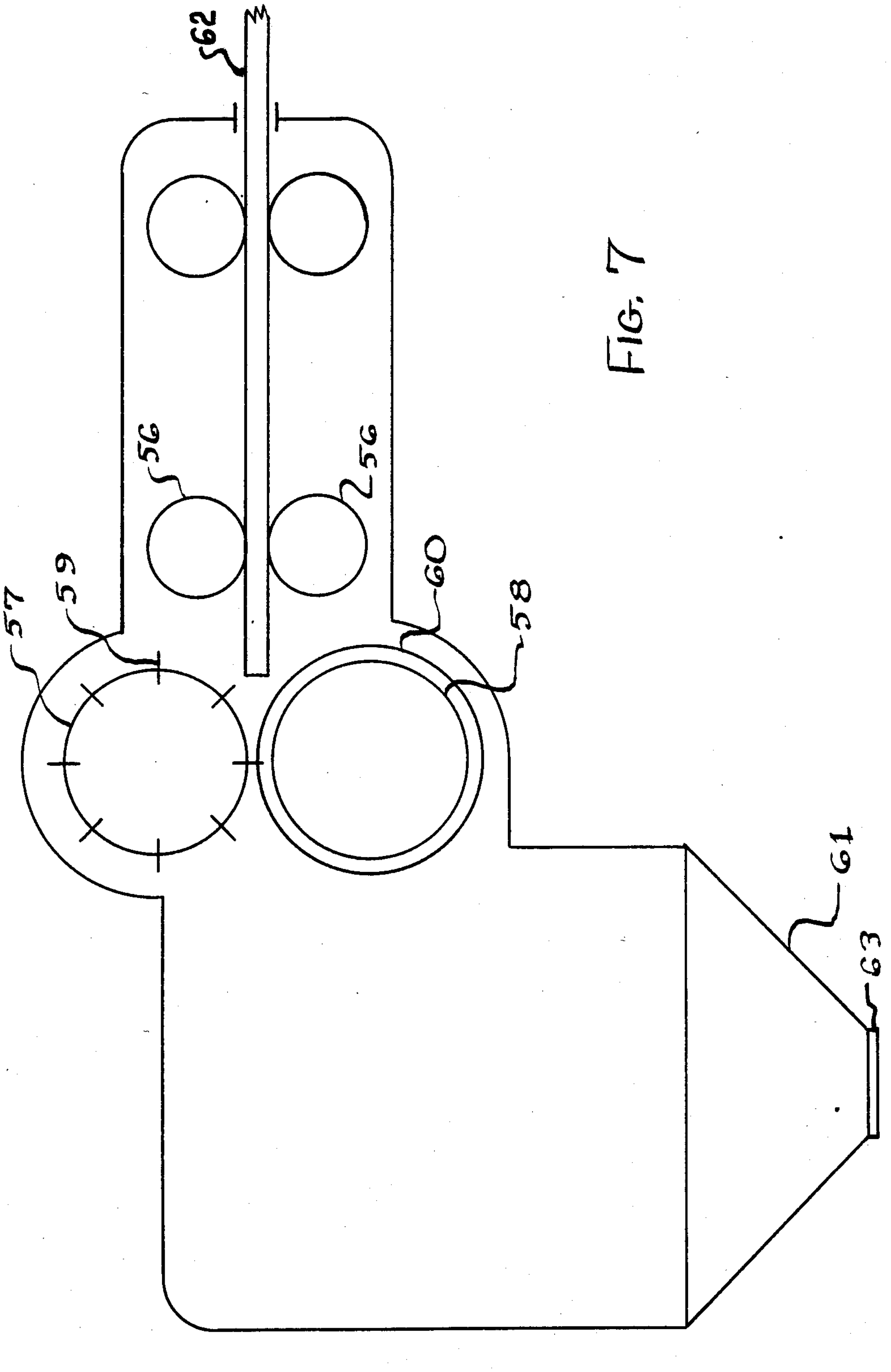
FIG. 7 is a diagrammatic view of the cutter or chopper for cutting the wood fibers of the mat into controlled fiber lengths at Station 8.

In FIG. 7 a wood fiber mat 62 of loosely bonded substantially separate wood fibers from the drier/shredder of FIG. 6 enters the chopper or cutter assembly and is moved or urged into the chopper blades by the mat feed rolls 56. Chopping or cutting is accomplished when the mat passes between the chopper roll 57 and the backing or backup roll 58. Sharp knife blades or cutting blades 59 are fastened or mounted in the chopper roll 57 and are oriented to extend in the radial direction. The cutting edges of the cutter blades 59 press through the wood fiber mat 62 against the rubber layer 60 formed around the backup roll or cutting block roll 58. In this manner the wood fibers of the mat 62 are cut into substantially uniform wood fiber lengths according to the spacing of the cutting blades 59 on the chopper roller 57. The spacing of blades 59 may be varied according to the fiber lengths required for a particular molding product application. The chopped fibers of substantially uniform length are gathered in the collecting bin 61 and then fed through the chute or hopper outlet 63 to a bagger or bagging apparatus not shown. A friable wood product material of substantially uniform wood fiber lengths is provided at this stage of the tree processing for repairing and mixing a wood material slurry for custom molding as hereafter described.

The elements of the tree processing system of FIG. 1, illustrated and described with reference to FIGS. 2–7, may be assembled together as a fully transportable system for example on two or more flat bed trucks. The output of this assembled portion of the tree processing and wood materials system is a friable wood material product of separated wood cellulose fibers of substantially uniform length with over 99% of the water and resins eliminated. The resins squeezed from the elongate trunk pieces and wood wastes by essentially "wringing out" the tree according to the tree processing method of the present invention provide another wood constituent product for transport to the molding site or factory. The resins have been separated from the water, however, at the site. Alternatively the molding site or fabricating site may be at the same location as the transportable tree processing equipment. In either event, the constituent tree products, namely the friable lignocellulosic wood material product of substantially uniform length wood fibers embedded in natural lignins and the separated resins are available for reconstitution in the wood material slurry for subsequent molding into custom molded wood products. Similarly, the constituent waste wood product is available for use as fuel for generating the system power and process steam and for recovering resins and lignins.

For a fully transportable system the compression roller sequence or graduated roller mill for extruding elongate pieces into wood sheets may be loaded on one flat bed truck reinforced with an I-beam beneath the length of the bed. The drier and shredder for processing the wood sheets may be located on a second flat bed or trailer bed while the boiler, turbine, and generator for system power may be located on a third trailer bed, etc. The wood waste processing sequence may be located on yet a fourth tractor trailer bed. The equipment may be skid-mounted with hydraulic jacks to rest directly, for example, on uneven ground for stable support. The fully transportable system may therefore produce the constituent tree products at the site, namely the friable lignocellulosic wood fiber material of substantially uniform wood fiber lengths, separated resins characteristic of the particular trees being processed, and wood wastes processed for fuel use. Some of the wood fuel is used at the tree processing site for system power while the remainder may be transported with the wood fiber material product and resin to the molding or fabrication site.

The transportable tree processing equipment for generating the constituent tree products, including the friable wood fiber material product, the separated resins, and the waste wood fuel, is intended to accommodate a number of parameter variations. For example, the graduated roller mill of graduated compressing rollers for extruding elongate pieces split from the trunk into flat wood sheets may compress the wood down to thin wood sheets over a range of thicknesses. For example, the graduated roller mill may extrude wood sheets having a thickness down to the range of 1/16 inch (0.16 cm) to 1/32 inch (0.08 cm). This is approximately the limit while still preserving the structure of the longitudinal wood cellulose fibers. The wood sheets may also be slightly thicker, for example up to ⅛ inch (0.3 cm) thick, however, in the preferred range of 1/16 inch (0.16 cm) to 1/32 inch (0.08 cm), the entire thickness of the wood sheet is readily accessible to the microwave beam pulses or to a mechanical shredder as hereafter described for converting the wood sheet into a loosely bonded mat of substantially separate fibers throughout.

The longitudinal wood fibers of the mat may also be cut into a variety of different prescribed substantially uniform lengths for example a uniform length in the range of 1 inch (2.5 cm) to 2 inches (5 cm). But of course other lengths may be used appropriate to a particular application.

Figure 8:
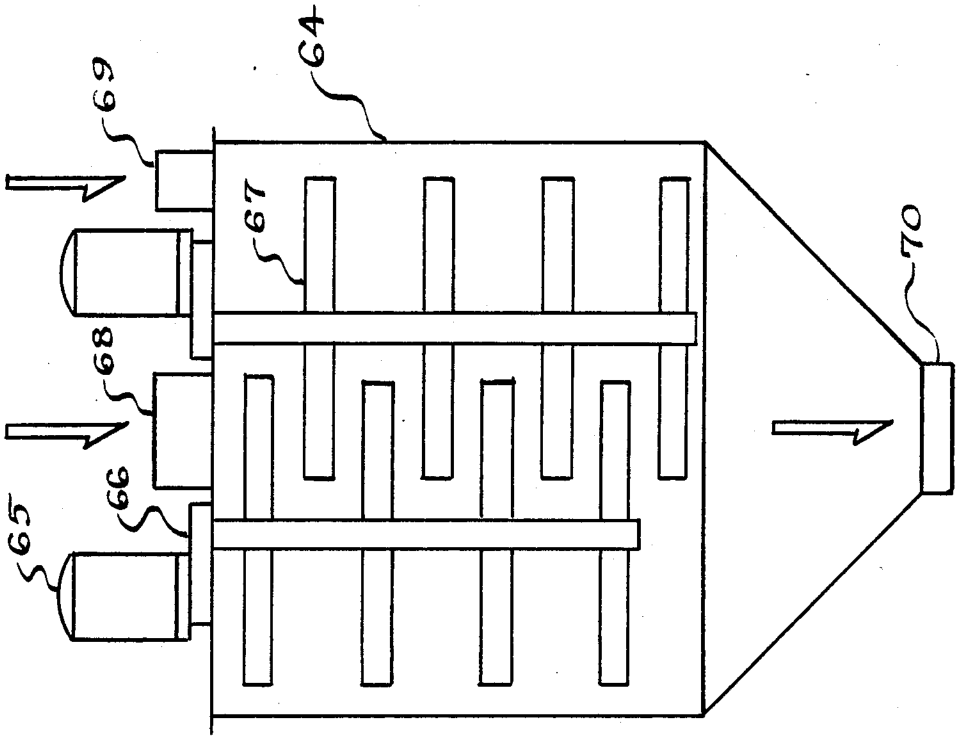
FIG. 8 is a diagrammatic view of the mixer at Station 9 for mixing the separated and processed solid and liquid constituents derived from the processed tree into a moldable slurry.

In the wood products molding or fabrication phase of the system, a mixer as illustrated in FIG. 8 produces a homogeneous slurry mixture of the wood material product lignocellulose wood fibers, recycled resins, lignins extracted from the waste wood and any desired additives such as bonding adhesives and catalysts. The molding site or wood products fabrication site may be at the same location as the tree processing phase of the system or at a separate location.

The mixer tank 64 contains two rotary mixing panels 67 driven by electric motors 65 through speed reducing devices 66, as shown in FIG. 8. The wood fiber material produced by the tree processing equipment of FIGS. 2–7 is fed into the mixer tank 64 through the wood fiber material inlet opening or chute 68 while the resins and liquid or powder additives required for the end product are introduced through the adhesive inlet nozzle 69. The wood cellulose fibers, resins, and additives are mixed for a sufficient time period to insure thorough mixing of the constituent materials to form a homogeneous slurry. Lignins in powered or liquid glue form may be added to the slurry. The slurry is delivered to the mold injection pump through the slurry hopper outlet chute or nozzle 70. An object and advantage of the present invention is a reconstitution of the tree constituents into a moldable slurry for fabrication of wood products by injection molding in any desired configuration. The process of the present invention permits maximum utilization of the constituent elements of the wood of the tree in the final slurry. Additionally, additives may be incorporated in the slurry to achieve desired structural or design features and characteristics in the final product. For example, the additives may include adhesive bonding materials such as liquid phenolic glue or lignin glues to enhance water resistant adhesive bonding of the lignocellulose wood fibers in the final product. Resins and lignins derived from a variety of different trees may also be incorporated in the slurry. Catalysts are used to facilitate curing of the slurry mixture in the final molds. Other additives may include waterproof glues, waxes, etc.

The molding process converts the homogeneous lignocellulose wood fiber/resin slurry or wood fiber/resin/additive slurry to a finished product by injecting the slurry into a mold. The cavity in the mold is the exact shape of the finished product which may include any configuration. The resins and bonding adhesives mixed in the slurry are thermosetting compounds which harden in the presence of applied heat. The heat is supplied by process steam derived for example from boiler 11 in turn fueled by the wood waste.

Figure 9:
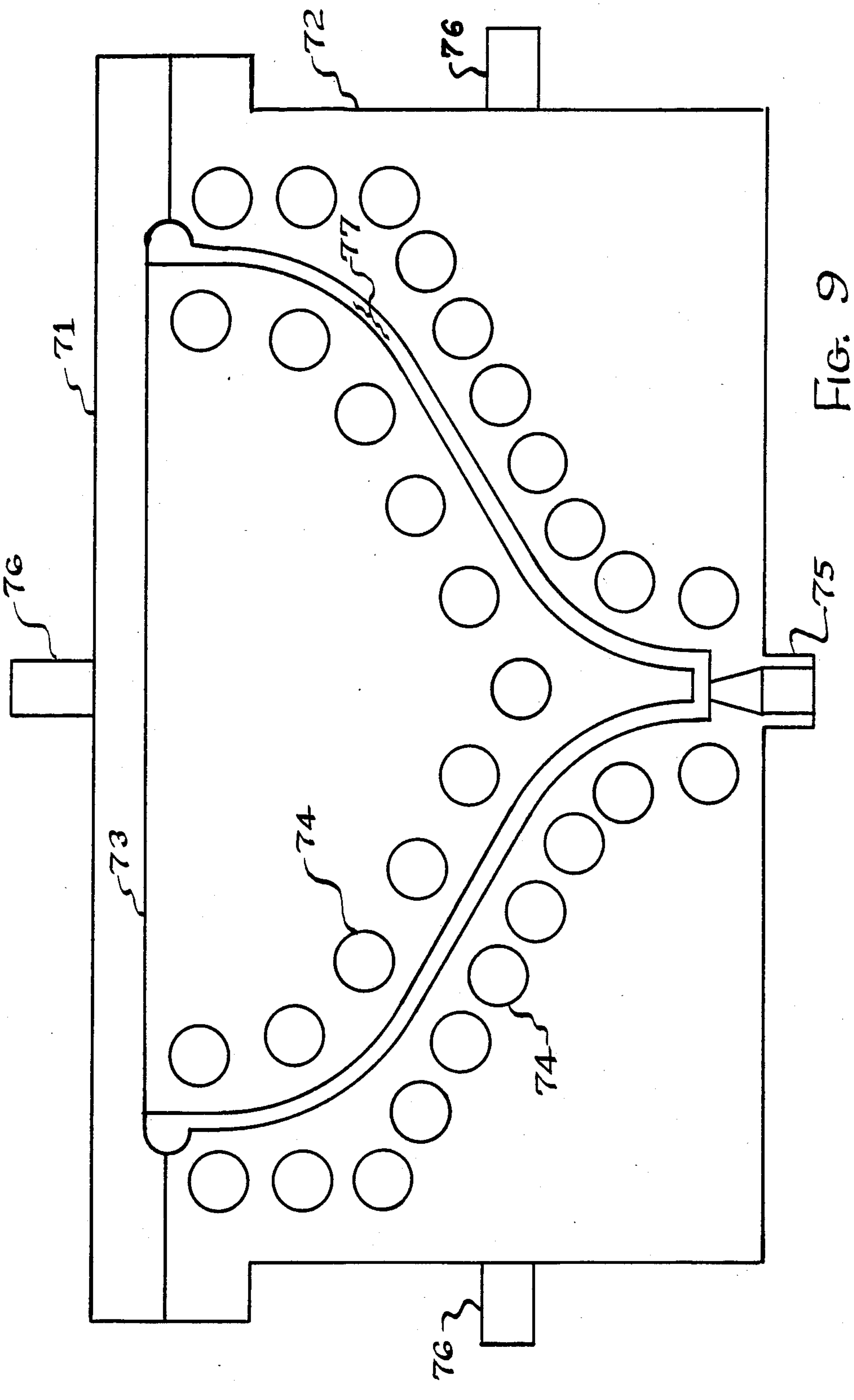
FIG. 9 is a diagrammatic view of an injection mold for custom molding a wood product boat hull at Station 10 from the reconstituted slurry.

In the diagrammatic illustration of FIG. 9 there is shown by way of example a boat hull mold which consists of three parts. The bottom or base 72 of the mold defines the bottom surface of the wood product. The cover 71 is bolted to the bottom 72 of the mold. The plug 73 defines the upper surface of the boat hull to be molded and is bolted to the cover 71. The plug 73 is spaced from the base 72 of the mold and defines the hollow space or cavity 77 in the exact shape of the finished wood product. Steam heat passageways or conduits 74 are embedded or located in both the bottom 72 and plug 73 of the mold. Steam generated for example by boiler 11 is supplied to the mold conduits or passageways 74 through steam nozzle inlets 76.

The slurry mixture is injected into the mold through the slurry inlet nozzle 75 by the injection pump 17. The pump continues to pump or inject the slurry into the mold until the cavity 77 is completely filled. Heat provided by process steam circulating in the steam passageways 74 of the mold hardens and cures the slurry mixture injected into the mold. Steam heat is supplied as long as required to fully cure the lignocellulose wood fiber/resin or wood fiber/resin/additive slurry mixture.

Figure 10A:
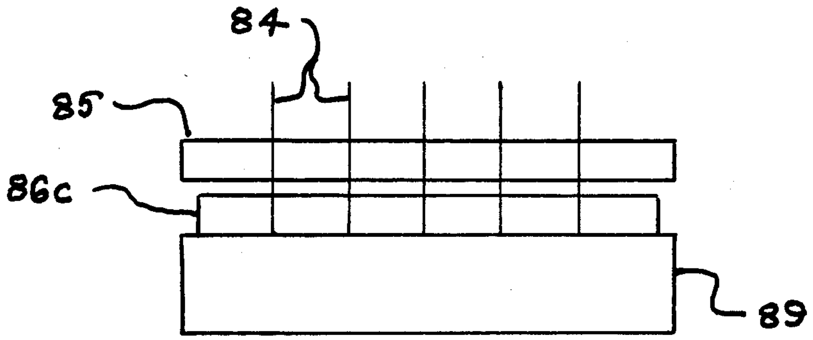
FIG. 10A is a detailed diagrammatic front section view of the row of circular cutting knives in the separating sequence in the direction of the arrows on line A—A of FIG. 10.
Figure 10:
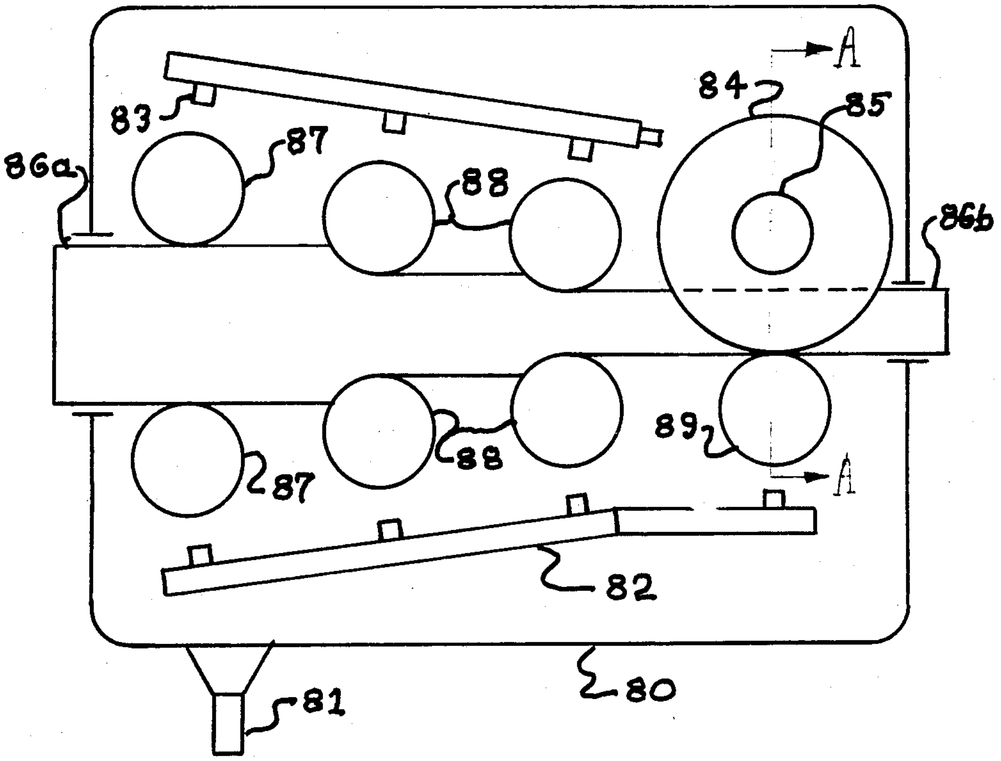
FIG. 10 is a diagrammatic view of an alternative separating sequence for dividing the trunk into separate elongate pieces of wood at Station 3 of the tree processing system.

An alternative arrangement for dividing or separating the trunk into separate elongate pieces of wood of smaller cross-sectional area at Station 3 of the tree processing, wood materials and wood products system is illustrated in FIGS. 10 and 10A. The trunk splitter illustrated in FIGS. 2 and 2A is eliminated and in its place is provided an initial trunk compression roller sequence followed by a row of rotating circular cutting knives. The initial trunk compression roll sequence is similar to the graduated rolling mill of FIG. 3 with a sequence of pairs of compressing rollers. In the trunk compression roll sequence, however, the rollers of the pairs of compressing rollers are spaced apart a distance adequate to accommodate the delimbed and debarked trunk. The rollers of the pairs of compressing rollers in the sequence are spaced successively closer together to crush and compress the trunk into a slab of wood having a width up to the maximum width of the rolls in the sequence.

The crushing and compressing action partially fragments and parts the wood fibers so that the slab may be readily cut into elongate pieces. From the initial trunk compression roll sequence, the slab of wood therefore passes through a row of vertically oriented and spaced apart rotating circular blades. The circular blades are formed with a knife-edge blade around the perimeter for cutting and parting the slab into elongate pieces of wood for further processing in the graduated roller mill at Station 4 as hereto for described.

As illustrated in further detail in FIG. 10, a delimbed and debarked tree trunk **86*a* is fed through the roll sequence by serrated feed rolls 87. The tree trunk is then rolled out to a slab of the required thickness by the trunk compressing rolls 88. The flattened tree trunk slab 86*b* is divided into separate elongate pieces 86*c* by the row of circular cutting knives 84 which includes five rotating splitter knives 84 supported on shaft 85 as shown in FIG. 10A. The outside diameter of the splitter knives 84 closely approaches the outside surface of the splitting backup roll 89 but does not contact it. The design tree of 8″ (20 cm) diameter is divided into six elongate pieces 86*c*. Each piece is approximately 8.4 $in.^2$ (54 cm) as heretofore described. The thickness of the flattened tree trunk slab 86*b* and the spacing of the splitter knives 84 are selected to obtain the preferred cross sectional area for elongate segments 86*c*. The rolls and splitter knives are surrounded by a housing 80*a* to control the vapor and spray that are generated when the unit is in operation. To minimize the build-up of resins on the rolls and splitter knives, they are continuously sprayed with hot water. The hot water is supplied through the spray water manifolds 82 and directed towards the rolls and knives by the spray heads 83. The hot water from the spray nozzles and the resins that have been squeezed out in the process of rolling, are collected in the bottom of the housing 80*a* and are then removed through the drain nozzle 81. The mixture of resin and water is directed to the resin/water separator at Station 6**.

Figures 11, 11A:
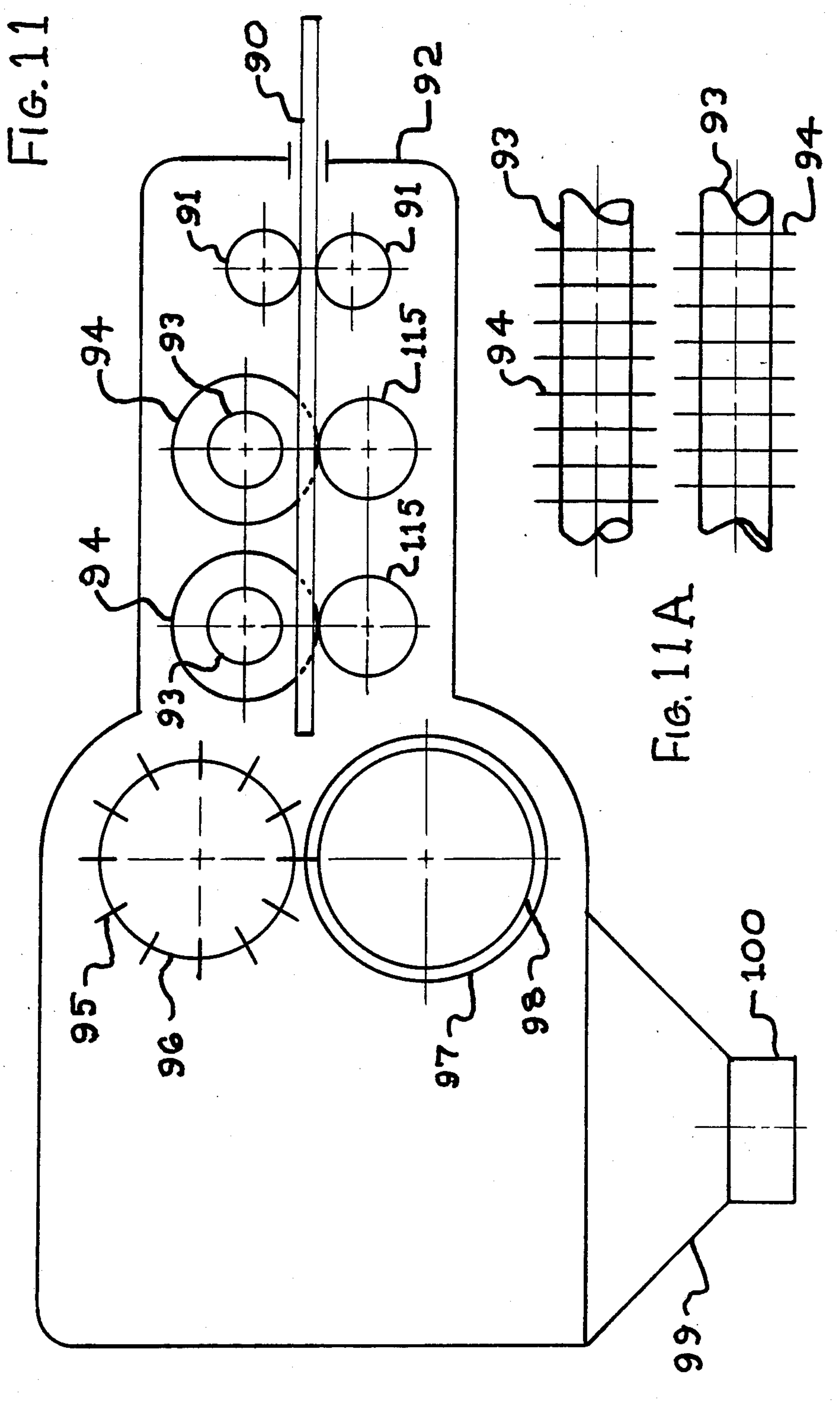
FIG. 11 is a block diagram of an alternative shredder and cutter for Stations 7 and 8 of the tree processing system.
FIG. 11A is a detailed fragmentary plan view of the two sets of rotating shredder knives of the shredder of FIG. 11 showing the offset relative to each other.

An alternative shredder and chopper arrangement for Stations 7 and 8 of tree processing, wood materials and wood products system is illustrated in FIGS. 11 and 11A. The microwave energy source described with reference to FIG. 6 is eliminated. In its place a rotating mechanical shredder arrangement is provided.

The 1/16″ (0.16 cm) thick wood panel or sheet 90 from the graduated roller mill compressing roll sequence FIG. 3 is fed into the shredder and chopper rolls of FIGS. 11 and 11A by the serrated drive rolls 91. The wood sheet 90 is then split into fine shreds by rotating circular splitter or shredder knives 94 that are supported on the arbors 93. There are two sets of rotating splitter or shredder knives offset relative to each other as shown in FIG. 11A. Fine shredding is therefore achieved without the necessity of using excessively thin knives. The outside diameters of the rotating splitter knives extend almost to the outside surface of the shredder backup rolls 115 but do not contact them.

The shredded wood mat is then delivered to a chopper. The chopper consists of a chopper roll having a number of sharpened steel cutting blades 95 secured to the chopper roll arbor 96. The sharpened ends of the blades 95 extend radially outward to a diameter that brings them into the elastomer periphery band or rim 97 on the chopper backup roll 98. The chopper blades sink into the elastomer band 97 producing a clean cutting action by the cutter blades 95 on the shredded wood mat 90. The shredder and chopper rolls are enclosed in a housing 92 to control dust that forms during the shredding and chopping actions and to protect operating personnel. The chopped, shredded wood falls into the collecting hopper 99 and is delivered through the outlet nozzle 100 for delivery to a dryer.

Another type of mechanical shredder can be provided at Station 7 by a conventional shredder in the form of a rotating roller or roll with shredder points or tips distributed over the surface of the roll. The rotating shredding roller is mounted and applied to the wood sheet extruded from the graduated rolling mill at Station 4 for scarifying and striating the wood sheet, thereby further separating and parting the wood fibers in the wood sheet into a mat of shredded fibers. The shredded and fragmented wood sheet or mat is then applied to the chopper at Station 8 as heretofore described providing wood fiber material of substantially uniform lengths. The uniform fiber length wood material product may then be further dried by passing through a conventional dryer such as an air dryer or furnace to achieve a desired moisture content before transfer to the molding site beginning at Station 9. In some applications the dryer and further drying step may be eliminated to conserve a desired moisture content level in the wood fiber material. Thus, the wringing action of the compressor rollers may remove sufficient moisture for many applications without further drying.

Figures 12, 12A:
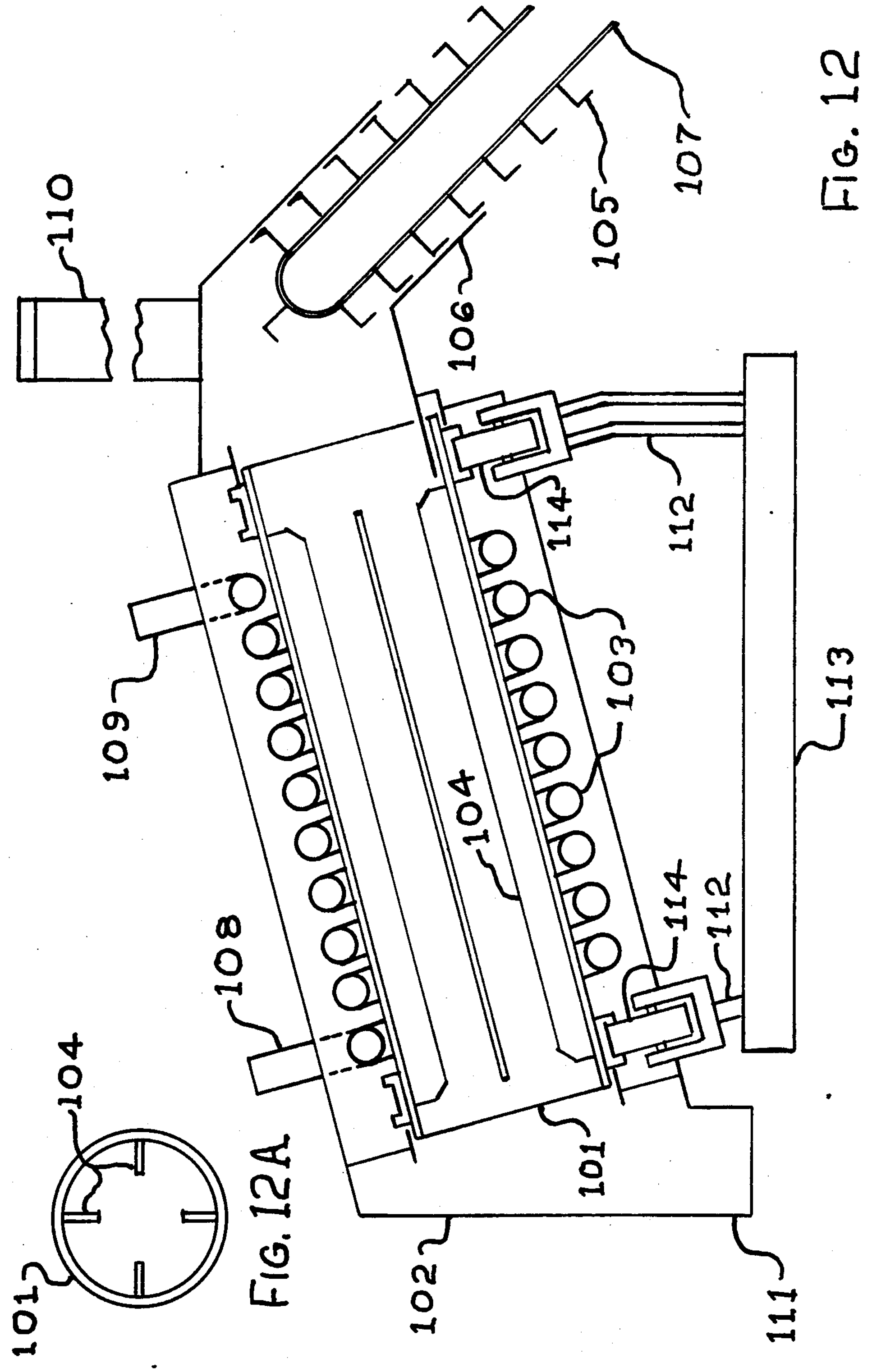

A dryer serves to remove all residual moisture from the chopped, shredded wood fibers in preparation for storage or shipment to the wood product molding operation. For applications requiring removal of further moisture, a dryer for receiving the substantially uniform length wood fibers from the shredder and chopper of FIGS. 11 and 11A is illustrated in FIG. 12. The dryer consists essentially of a cylindrical, rotating drum 101 inside a housing 102. The drum is supported at its ends by roller bearings 114 which are held in position by support struts 112 that are mounted on the dryer base 113. The drum rotates within a stationary, steam heated coil 103. The steam is supplied through the inlet nozzle 108 and exits through nozzle 109. The chopped, shredded wood fibers are delivered to the dryer by a feed conveyor. The conveyor consists of a power driven endless belt 107 formed with upright partitions or lifts 105. The chopped shredded wood is dropped onto the top of the moving belt and is lifted to the upper end of the dryer drum 101. The conveyor extends into the dryer housing 102 through a close fitting chute 106 that serves to prevent the draft of chimney 110 from pulling air in through the conveyor rather than through the interior of the dryer drum 101. The interior of the drum is fitted with ribs 104 which serve to lift and drop the wood fibers through the center of the drum. As a result, the wood fibers pass through the moving air flow at the interior of the drying drum rather than along the inside surface of the drum. The air inside the drum 101 is warmed by the steam heat coils 103 and moves up the chimney 110 creating a draft which promotes the movement of dry cold air from outside the dryer through the drum. The dried wood fiber is dropped out of the lower end of the dryer drum 101 through the exit chute 111.

In the design and arrangement of the compressor roll sequence for extruding elongate pieces split from the trunk into thin sheets of wood the last pair of rolls determines the final sheet thickness and uniformity. For this reason the final set of rolls is a precision set of rolls precision adjusted to give the desired thickness. As the rolls are worn they are moved upstream for earlier stages of compression which are not as sensitive to variations due to wear. Typically, each set of rolls reduces the thickness of the processing wood pieces by the same fixed percentage for sequential absolute reduction in thickness dimension. For example, each pair of rollers in the compression sequence may produce a 40% thickness reduction or thickness reduction in the range of 40-50%. For a 50% reduction with each pass between a pair of compressing rollers, seven pairs of compression rolls are used in the graduated rolling mill for starting with a typical trunk no greater than 8 inches (20 cm) diameter. The final set of rollers constitutes the precision rolls preceded by the graduated pairs of rolls in the sequence and the initial feed roll pair 26. The feed rolls include ridges or structural features for grabbing and holding the wood as it is processed through the rolling mill. Furthermore, each of the pairs of compression rollers are power driven to maintain and facilitate uniform motion of the wood through the mill as it is transformed from an elongate piece split from the trunk to a flattened sheet of wood. The roller drives may be synchronized by, for example, microprocessor control to achieve the desired uniform motion of the wood through the mill.

While the ideal tree size for processing at the wood lot site is in the range of, for example, 6 inches (15 cm) to 8 inches (20 cm), larger trees may be processed by adding a larger splitter or separating assembly, and adding upstream rollers to the compressing roll sequence to accommodate larger pieces.

The system and method for tree processing according to the present invention results in a new wood product material in the final molded product. The cured wood product is a composite material of a uniform length lignocellulose wood fiber phase isotropically distributed in a binding phase of resins and plastics including natural resins, natural lignins and, for example, additive adhesive binders such as phenolic resin glues and lignin glues. The wood fiber phase itself comprises cellulose fibers embedded in the natural lignins. The friable uniform length lignocellulose wood fibers derived from the tree processing are mixed in the slurry which includes the natural resins derived from the tree. The resins coat the lignocellulose wood fibers and facilitate and enhance the bonding and binding of additive glues such as phenolic resin glues to the lignocellulose material fibers.

The result is a highly water resistant and impenetrable composite matrix of cellulose fibers, lignin, resins, and adhesive binders or glues. The new composite multi-phase material incorporates the advantages of the characteristics of natural wood with isotropic distribution of the uniform length lignocellulose fibers for uniform strength in all directions and with greater resistance and impenetrability imparted by the matrix of lignocellulose, resin, and binder materials. Furthermore, the natural resin materials facilitate and enhance the bonding of additive thermosetting resins, phenolic glues or lignin glues to the lignocellulosic fibers.

Figure 13:
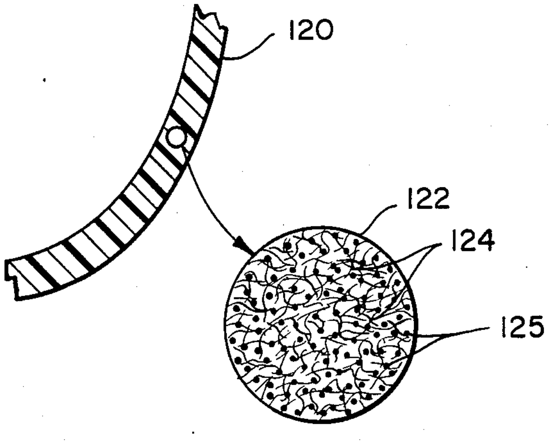
FIG. 13 is a detailed diagrammatic exploded view of a fragmentary portion of the composite material in accordance with the invention enlarged from a cross-section or cut away of the moloded boat hull showing the isotropic distribution of uniform length lignocellulose fibers in the binding phase matrix of natural wood resins and additive plastic resins.

In FIG. 13 a fragmentary portion of a section or cut away of a boat hull 120 molded according to the invention in the boat hull mold of FIG. 9 is enlarged to provide a detailed diagrammatic exploded view 122 of the composite material. The new composite multiphase wood product material of the invention is characterized by an isotropic distribution of inform length lignocellulose fibers 124 distributed in the matrix 125 including natural wood resins and additive plastic resins or glues. The additive plastic resins may include thermosetting resins, phenolic gleues and lignin glues. The natural resin materials facilitate the bonding of the additive plastic resins and lignocellulose fibers.

Thus, the present invention provides a multi-phase material composite from the reconstituted and recombined tree wood constituents including a uniform length isotropically distributed lignocellulose fiber phase and a plastic and resin phase of natural tree wood resins and additive plastic resins binding the lignocellulose fiber phase in a composite matrix.

While the invention has been described with reference to particular example embodiments, it is intended to cover all variations and equivalents within the scope of the following claims.

I claim:

1. A method of processing a tree into a lignocellulose wood fiber material for custom molded wood products comprising:

delimbing a tree, removing the limbs and leaves from the trunk:

debarking the delimbed trunk of the tree;

separating the debarked trunk into a plurality of elongate pieces of approximately equal cross-sectional area;

feeding the individual split, elongate pieces through a sequence of pairs of compressing rollers, the rollers of each pair of compressing rollers in the sequence being spaced successively closer together and arranged for compressing the elongate pieces to successively thinner wood sheets, squeezing out water and resins:

collecting the resins and water mixture squeezed from the wood sheets:

separating the resins from the water:

shredding and fragmenting the fibers of each wood sheet into substantially separated wood fibers:

and cutting or chopping the substantially separated wood fibers of the wood sheets into substantially uniform lengths of wood fibers.

2. The method of claim 1 further comprising:

mixing the chopped wood fibers with resins and with selected additives forming a wood fiber, resin and additive slurry:

and injecting the slurry into a mold of desired configuration.

3. The method of claim 2 wherein said additives comprise adhesive bonding additives.

4. The method of claim 2 wherein said resins comprise resins collected during the compressing of the wood sheets and separated from the water.

5. The method of claim 1 comprising separating the debarked trunk into six elongate pieces of approximately equal cross-sectional area.

6. The method of claim 5 wherein the step of separating the debarked trunk comprises splitting the trunk by passing the trunk through a splitter having a diameter blade across a diameter of the trunk and spaced apart blades orthogonal to the diameter blade for cutting two rows of elongate pieces.

7. The method of claim 1 comprising compressing the elongate pieces to successively thinner wood sheets having final cross-sectional area no greater than approximately 60% of the cross-sectional area of the starting elongate pieces of wood.

8. The method of claim 7 comprising compressing the wood pieces to a final thickness no greater than approximately 1/16" (0.16 cm).

9. The method of claim 1 comprising:

processing limb and leaf wood waste removed from the tree during delimbing by compressing the limb and leaf wood waste between successive pairs of processing rollers;

processing bark wood waste removed from the trunk during debarking by compressing the bark wood waste through successive pairs of processing rollers;

removing sufficient water and resin by compressing the wood wastes for use of the wood wastes as fuel;

collecting the water and resin mixture and separating resins from water;

and feeding the wood wastes to the fire box of a boiler for producing steam.

10. The method of claim 1 comprising the further step of drying the compressed wood sheets.

11. The method of claim 10 comprising exhausting moisture-laden air away from the wood sheets while separating the moisture from the exhaust air.

12. The method of claim 1 comprising the step of air drying the chopped wood fibers.

13. The method of claim 1 comprising the step of spraying the pairs of compressing rollers with high velocity hot water and collecting water and resins draining from the wood sheets and rollers.

14. The method of claim 13 comprising flotation separating the water and resins and recycling the water for heating and spraying on the compressing rollers.

15. The method of claim 1 wherein the step of separating the trunk into elongate pieces comprises crushing and compressing the trunk to a slab of wood and cutting the slab into said separate elongate pieces of wood.

16. A system for converting a tree into custom molded wood products comprising;

a delimber, for removing limbs and leaves from the trunk of a tree;

a debarker for removing bark from the trunk of the delimbed tree:

splitter means constructed and arranged for separating the debarked trunk into elongate pieces of substantially equal cross-sectional area;

a first sequence of a plurality of pairs of compressor rollers having an input end for receiving the elongate pieces of wood and an output end for delivering thin sheets of wood, said first sequence comprising successive pairs of compressor rollers, the rollers of each pair being spaced successively closer together for compressing the elongate pieces of wood to successively thinner lignocellulose wood sheets, squeezing out water and resins;

collector means collecting the water and resins squeezed form the sheets of wood;

separator means for separating the resins from the water;

shredder means for fragmenting and shredding the wood fibers of the wood sheets into a mat of substantially separated lignocellulose wood fibers;

and chopper means for chopping or cutting the substantially separate wood fibers into uniform selected fiber lengths.

17. The system of claim 16 further comprising:

a mixer for mixing the chopped wood fibers with resins and with selected additives to form a wood fiber, resin and additive slurry;

a mold for molding the slurry in a desired wood product configuration;

and injection means for injecting the slurry into the mold.

18. The system of claim 17 further comprising a slurry of wood fibers, resins, and adhesive binders.

19. The system of claim 17 wherein the slurry comprises thermosetting compounds including resins collected by the collector means and separated from the water.

20. The system of claim 16 wherein the splitter means comprises an annular blade support having a truncated conical configuration tapering from a smaller diameter entrance end for receiving the debarked trunk to a wider diameter exit end, a diameter wedge blade extending across the diameter of the annular blade support with the blade edge facing the entrance end, and spaced apart wedge blades orthogonal to the diameter wedge blade dividing the splitter area inside the annular blade support into a plurality of substantially equal areas.

21. The system of claim 16 wherein the splitter means comprises an initial trunk compressor roll sequence for compressing and crushing the trunk to a slab of wood, and cutting knife blade means for cutting and separating the slab into said elongate pieces of wood.

22. The system of claim 21 wherein the cutting knife blade means comprises a row of parallel rotation circular cutting blades.

23. The system of claim 16 wherein the shredder means comprises a mechanical shredder producing a mat of loosely bonded substantially separate wood fibers.

24. The system of claim 22 wherein the chopper means comprises;

a cutting roller comprising a plurality of spaced radially extending blades;

a backing roller having a flexible surface positioned and arranged for abutting the radially directed blades of the cutting roller;

and feed means for feeding the loosely bonded mat of substantially separate wood fibers between said cutting roller and backing roller.

25. The system of claim 16 further comprising:

a second sequence of a plurality of pairs of compressing rollers;

hopper means operatively positioned to receive limb wood waste and leaf wood waste removed from the tree and bark stripped from the trunk and directing the wood waste into said second sequence, said second sequence comprising successive pairs of rollers, each pair being spaced successively closer together for compressing the waste wood and squeezing out water and resin; and guide panels interposed between adjacent pairs of rollers for guiding the waste wood.

26. The system of claim 16 comprising first spray means operatively coupled for spraying hot water on the first sequence of plurality of pairs of compressing rollers.

27. The system of claim 25 comprising second spray means operatively coupled for spraying hot water on the second sequence of plurality of pairs of compressing rollers.

28. The system of claim 23 wherein the mechanical shredder comprises a shredding roller having shredding points formed over the surface of the roller for scarifying and striating the wood sheets.

29. A lignocellulose and plastic material composite comprising a first phase of isotropically distributed uniform length lignocellulose fibers or filaments and a second phase bonding the lignocellulose fibers in a matrix comprising natural wood resins coating the lignocellulose fibers and additive plastic resins bonding to the natural resins and lignocellulose fibers.

30. The material composite of claim 29 wherein the additive plastic resins comprise thermosetting phenolic resin glues.

31. The material composite of claim 29 further comprising lignin glues as a constituent of the matrix.

* * * * *